US012764735B2

(12) United States Patent
Lalwala

(10) Patent No.: US 12,764,735 B2
(45) Date of Patent: Oct. 13, 2026

(54) SCHEDULER OPTIMIZATION TO EFFICIENTLY USE DISTRIBUTED UNIT (DU) RESOURCES IN POOLING ENVIRONMENT

(71) Applicant: Rakuten Symphony, Inc., Tokyo (JP)

(72) Inventor: Ronak Bharatkumar Lalwala, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 371 days.

(21) Appl. No.: 18/518,676

(22) Filed: Nov. 24, 2023

(65) Prior Publication Data

US 2025/0175973 A1 May 29, 2025

(51) Int. Cl.
*H04W 72/1263* (2023.01)

(52) U.S. Cl.
CPC ............................... *H04W 72/1263* (2013.01)

(58) Field of Classification Search
CPC ............. H04W 72/1263; H04W 72/23; H04W 52/0216; H04W 52/0229; H04L 5/0048; Y02D 30/70
See application file for complete search history.

(56) References Cited

U.S. PATENT DOCUMENTS

2017/0265171 A1* 9/2017 Rico Alvarino ...... H04L 5/0048
2018/0242320 A1* 8/2018 Wong ........................ H04L 1/08
2018/0279366 A1* 9/2018 Harada ............. H04W 74/0808
2019/0082452 A1* 3/2019 Zheng ................... H04W 72/21
2020/0053666 A1* 2/2020 Park .................... H04W 52/346

* cited by examiner

*Primary Examiner* — Sun Jong Kim
(74) *Attorney, Agent, or Firm* — HAUPTMAN HAM, LLP

(57) ABSTRACT

Scheduler optimization to efficiently use Distributed Unit (DU) resources in pooling environment. Subframe scheduling information is able to be passed from an uplink (UL) scheduler to a downlink (DL) scheduler. DL scheduling is performed by a DL scheduler for subframe N using X subframe look ahead at subframe N-X. UL scheduling is performed by a UL scheduler for the subframe N using Y subframe look ahead at subframe N-Y. A priori UL information about the subframe N-Y previously determined by the UL scheduler is obtained.

17 Claims, 6 Drawing Sheets

SCHEDULER OPTIMIZATION TO EFFICIENTLY USE DISTRIBUTED UNIT (DU) RESOURCES IN POOLING ENVIRONMENT

TECHNICAL FIELD

This description relates to scheduler optimization to efficiently use Distributed Unit (DU) resources in pooling environment, and method of using the same.

BACKGROUND

More cells are being aggregated into a baseband processing unit. For example, a Virtualized Radio Access Network (vRAN) Distributed Unit (DU) groups multiple carriers within the same baseband application to obtain efficiency on hardware (HW) resources. Instead budgeting resources for peak load for a predetermined number of cells in a same baseband processing unit, then an average load of 60% or 70% is able to be budgeted. The operator determines the average load budget based on how much silicon the operator is able to invest.

In response to budgeting for 60% or 70% average load, statistically some cells are able to operate at peak load, but overall the cells are to operate at 60% or 70% average load. Using average load rather than peal load, the overall cost is reduced, and the per cell cost also decreases. In response to cells operating above the budget at the same time, a real time processing failure at the baseband processing unit occurs. This leads to performance degradation, or instabilities. A scheduler imposes restrictions so that the average load limit is not violated. Currently, a scheduler uses a static downlink and uplink Physical Resource Block (PRB) restriction to mitigate this overload scenario.

SUMMARY

In at least embodiment, a method for optimizing use of Distributed Unit (DU) resources in an environment of pooling of carriers includes enabling passing of subframe scheduling information from an uplink (UL) scheduler to a downlink (DL) scheduler. DL scheduling is performed by the DL scheduler for subframe N using X subframe look ahead at subframe N-X. UL scheduling is performed by the UL scheduler for the subframe N using Y subframe look ahead at subframe N-Y. A priori UL information is obtained about the subframe N-Y previously determined by the UL scheduler.

In at least embodiment, A scheduler for optimizing use of Distributed Unit (DU) resources in an environment of pooling of carriers, wherein the scheduler is configured to enable passing of subframe scheduling information from uplink (UL) scheduling to a downlink (DL) scheduling. The DL scheduling is performed for subframe N using X subframe look ahead at subframe N-X. The UL scheduling is performed for the subframe N using Y subframe look ahead at subframe N-Y. A priori UL information is obtained about the subframe N-Y previously determined by the UL scheduling.

In at least one embodiment, a non-transitory computer-readable media having computer-readable instructions stored thereon, which when executed by a processor causes the processor to perform operations including enabling passing of subframe scheduling information from an uplink (UL) scheduler to a downlink (DL) scheduler. DL scheduling is performed by the DL scheduler for subframe N using X subframe look ahead at subframe N-X. UL scheduling is performed by the UL scheduler for the subframe N using Y subframe look ahead at subframe N-Y. A priori UL information is obtained about the subframe N-Y previously determined by the UL scheduler.

BRIEF DESCRIPTION OF THE DRAWINGS

Aspects of the present disclosure are best understood from the following detailed description when read with the accompanying figures. It is noted that, in accordance with the practice in the industry, various features are not drawn to scale. In fact, the dimensions of the various features are able to be increased or reduced for clarity of discussion.

DETAILED DESCRIPTION

Figure 1:
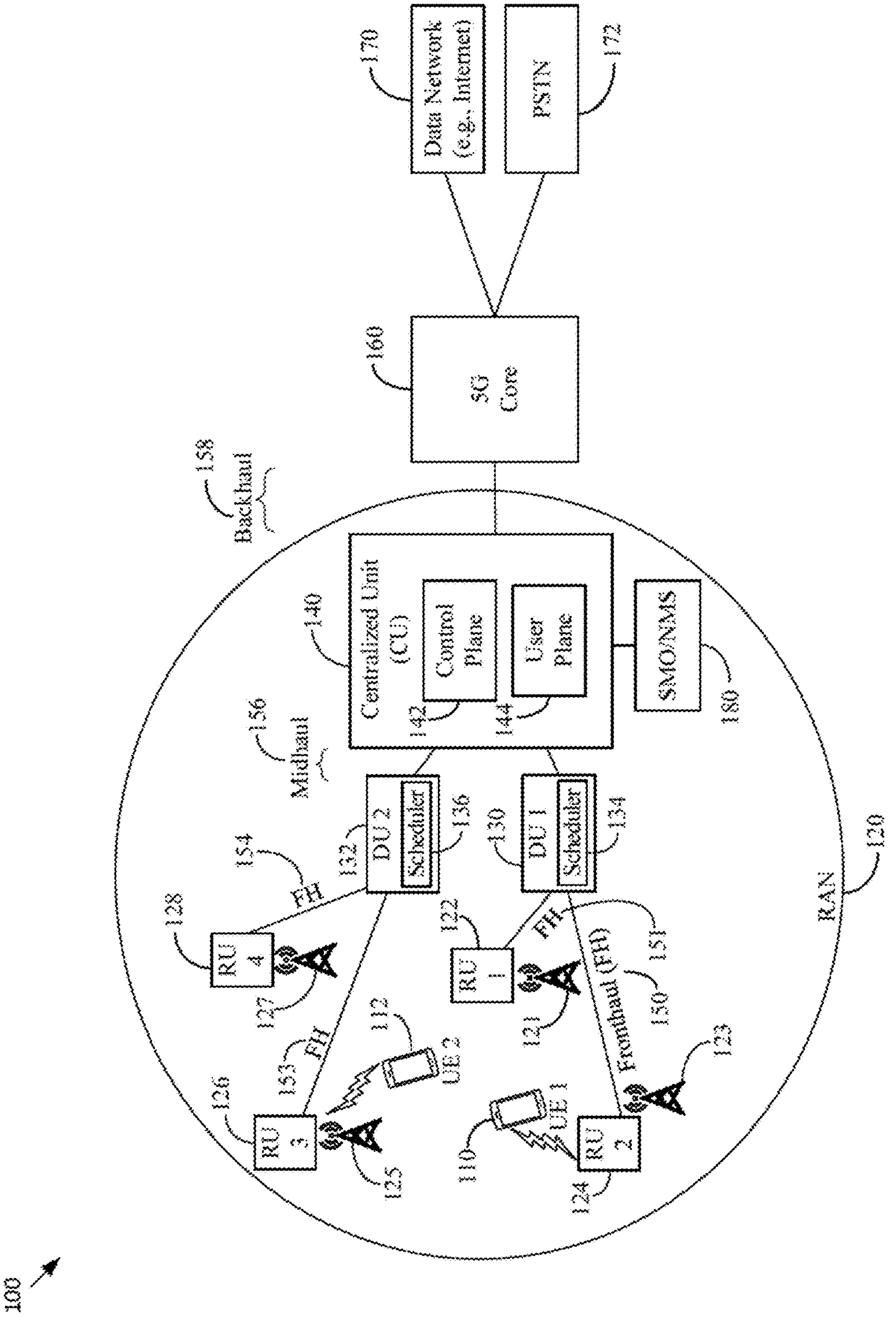
FIG. 1 illustrates a mobile network according to at least one embodiment.

Embodiments described herein describes examples for implementing different features of the provided subject matter. Examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact and include embodiments in which additional features are formed between the first and second features, such that the first and second features are unable to make direct contact. In addition, the present disclosure repeats reference numerals and/or letters in the various examples. This repetition is for the purpose of simplicity and clarity and does not in dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus is otherwise oriented (rotated 90 degrees or at other orientations) and the spatially relative descriptors used herein likewise are interpreted accordingly.

Terms like "user equipment," "mobile station," "mobile," "mobile device," "subscriber station," "subscriber equipment," "access terminal," "terminal," "handset," and similar terminology, refer to a wireless device utilized by a subscriber or user of a wireless communication service to receive or convey data, control, voice, video, sound, gaming, data-streaming or signaling-streaming. The foregoing terms are utilized interchangeably in the subject specification and related drawings. The terms "access point," "base station," "Node B," "evolved Node B (eNode B)," next generation Node B (gNB), enhanced gNB (en-gNB), home Node B (HNB)," "home access point (HAP)," or the like refer to a wireless network component or apparatus that serves and receives data, control, voice, video, sound, gaming, data-streaming or signaling-streaming from UE.

Embodiments described herein provide a Scheduler that optimizes Distributed Unit (DU) resources in an environment of pooling of carriers. Subframe scheduling information is able to pass from an uplink (UL) scheduler to a downlink (DL) scheduler so that UL Scheduler is able to share scheduling information with DL Scheduler. DL scheduling is performed by a DL scheduler for subframe N using X subframe look ahead at subframe N-X, and a UL scheduler using Y subframe look ahead at subframe N-Y. In at least one embodiment, X is equal to 2 for providing 2 subframe look ahead at subframe N-2 by DL scheduler, and Y is equal to 6 for providing 6 subframe look ahead at subframe N-6 by UL scheduler. The timing relationship between the UL look ahead and the DL look ahead is able to be different from the 2 subframe look ahead for DL scheduling and the 6 subframe look ahead for UL scheduling. For example, the DL scheduling is able to look at N-2 whereas the UL scheduling is able to be performed using one of 5 subframe look ahead at subframe N-5, 6 subframe look ahead at subframe N-6, or 7 subframe look ahead at subframe N-7. A priori UL information about the subframe N-Y previously determined by the UL scheduler is obtained by the DL Scheduler. L1 processing for over the area N overlaps with N-2 UL decoding processing. Looking at N, when DL scheduler is getting scheduled for N, the UL scheduler already has access to scheduling information for N-2 from L2 UL processing, i.e., N-2, based on UL scheduler processing N-2 at N-8. The a priori UL information includes scheduled PRB knowledge.

In at least one embodiment, a method for optimizing use of Distributed Unit (DU) resources in an environment of pooling of carriers includes enabling passing of subframe scheduling information from an uplink (UL) scheduler to a downlink (DL) scheduler, performing DL scheduling by the DL scheduler for subframe N using X subframe look ahead at subframe N-X, performing UL scheduling by the UL scheduler for the subframe N using Y subframe look ahead at subframe N-Y, and obtaining a priori UL information about the subframe N-Y previously determined by the UL scheduler.

Embodiments described herein provide a method that provides one or more advantages. For example, by using a priori UL scheduled PRB knowledge, the downlink PRB limit is increased in case the UL scheduler is under scheduled. Using the a priori information also results in increased cell level throughput, PRB utilization improvement, and improvement of overall KPIs in the network for busy load scenarios.

FIG. 1 illustrates a mobile network 100 according to at least one embodiment.

In FIG. 1, UE 1 (User Equipment 1) 110 and UE 2 112 access Mobile Network 100 via a Radio Access Network 120. Radio Access Network 120 includes Radio Towers 121, 123, 125, and 127. Radio Towers 121, 123, 125, 127 are associated with RU (Radio Unit) 1 122, RU 2 124, RU 3 126, and RU 4 128, respectively.

RU 1 122, RU 2 124, RU 3 126, RU 4 128 handle the Digital Front End (DFE) and the parts of the PHY layer, as well as the digital beamforming functionality. RU 1 122 and RU 2 124 are associated with Distributed Unit (DU) 1 130, and RU 3 126 and RU 4 128 are associated with DU 2 132. DU 1 130 and DU 2 132 are responsible for real time Layer 1 and Layer 2 scheduling functions. For example, in 5G, Layer-1 is the Physical Layer, Layer-2 includes the Media Access Control (MAC), Radio link control (RLC), and Packet Data Convergence Protocol (PDCP) layers, and Layer-3 (Network Layer) is the Radio Resource Control (RRC) layer. Layer 2 is the data link or protocol layer that defines how data packets are encoded and decoded, how data is to be transferred between adjacent network nodes. Layer 3 is the network routing layer and defines how data is moves across the physical network.

DU 1 130 is coupled to the RU 1 122 and RU 2 124, and DU 2 132 is coupled to RU 3 126 and RU 4 128. DU 1 130 and DU 2 132 run the RLC, MAC, and parts of the PHY layer. DU 1 130 and DU 2 132 include a subset of the eNB/gNB functions, depending on the functional split option, and operation of DU 1 130 and DU 2 132 are controlled by Centralized Unit (CU) 140. CU 140 is responsible for non-real time, higher L2 and L3. Server and relevant software for CU 140 is able to be hosted at a site or is able to be hosted in an edge cloud (datacenter or central office) depending on transport availability and the interface for the Fronthaul connections 150, 151, 153, 154. The server and relevant software of CU 140 is also able to be co-located at DU 1 130 or DU 2 132, or is able to be hosted in a regional cloud data center.

CU 140 handles the RRC and PDCP layers. The gNB includes CU 140 and one or more DUs, e.g., DU 1 130, connected to CU 140 via Fs-C and Fs-U interfaces for a Control Plane (CP) 142 and User Plane (UP) 144, respectively. CU 140 with multiple DUs, e.g., DU 1 130, and DU 2 132, support multiple gNBs. The split architecture enables a 5G network to utilize different distribution of protocol stacks between CU 140, and DU 1 130 and DU 2 132, depending on network design and availability of the Midhaul 156. While two connections are shown between CU 140 and DU 1 130 and DU 2 132, CU 140 is able to implement additional connections to other DUs. CU 150, in 5G, is able to implement, for example, 256 endpoints or DUs. CU 140 supports the gNB functions such as transfer of user data, mobility control, RAN sharing (MORAN), positioning, session management, etc. However, one or more functions are able to be allocated to the DU. CU 140 controls the operation of DU 130 and DU 132 over the Midhaul interface 156.

Backhaul 158 connects the 4G/5G Core 160 to the CU 140. Core 160 may be, for example, up to 200 km away from the CU 140. Core 160 provides access to voice and data networks, such as Internet 170 and Public Switched Telephone Network (PSTN) 172.

RAN 120 is able to implement beamforming that allow for directional transmission or reception. 5G beamforming enables 5G connections to be more focused toward a receiving device. RAN 120 is also able to implement MIMO (Multiple Input Multiple Output), including mMIMO (massive MIMO), to provide an increases in throughput and signal-to-noise ratio (SNR). MIMO improves the radio link by using the multiple paths over which signals travel from the transmitter to the receiver. The multiple paths are decorrelated and this provides the opportunity to send multiple data streams over them.

Massive MIMO and dense small cell deployments are being implemented to improve radio resource efficiency. However, the intra-cell interference from neighboring cells present a serious problem. According to at least one embodiment, the modeling of interference patterns in a Massive MIMO deployment is used to identify interfering beams between different sectors so that interference optimization techniques are able to be applied to address interference.

According to at least one embodiment, a northbound platform for the network is provided, such as a Service Management and Orchestration (SMO)/NMS 180. SMO 180 oversees the orchestration aspects, and the management and automation of RAN elements. SMO 180 supports O1, A1 and O2 interfaces.

According to at least one embodiment, DU 130, 132 include Scheduler 134, 136, respectively, which implement Scheduler Optimization that uses information about what is actually scheduled in UL to scale the average load limit in DL to increase Physical Resource Blocks (PRBs). The Scheduler Optimization of Schedulers 134, 136 improves the spectral efficiency of the DL. Operators are usually more concerned about the DL because that is where benchmarks for download and upload speeds are measured. In the scenario where UL is not heavily loaded, but there are a lot of streaming requests coming in, the network is able to relax the static limit of 70%, and is actually able to go increase to 100%. The Scheduler Optimization method implemented by Schedulers 134, 136 according to at least one embodiment applies to 4G and 5G networks and is able to be implemented with RAN 120 with function disaggregation for RU 122, 128, DU 130, 132, CU 140. RAN 120 is able to use an Intelligent Controller. However, the Scheduler Optimization method implemented by Schedulers 134, 136 according to at least one embodiment provides scheduling of subframes within 5 ms. A Near-Real Time RAN Intelligent Controller (N-RT RIC) is not be able to solve this issue because even the response time for N-RT RIC is above 10 ms, whereas the decisions of Schedulers 134, 136 occur in less than 5 ms.

Figure 2:
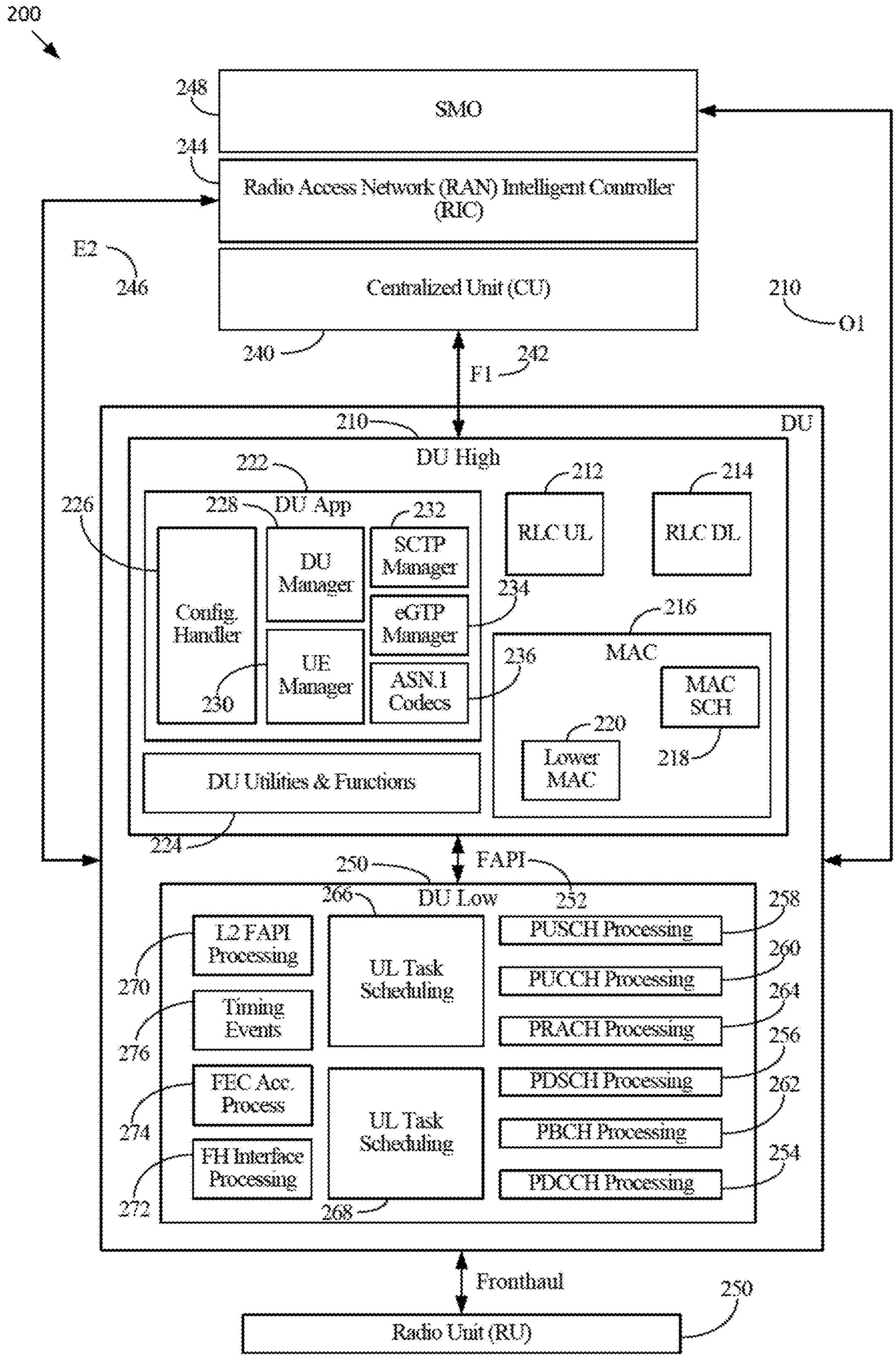
FIG. 2 illustrates Architecture Diagram of a Distributed Unit (DU) according to at least one embodiment.

FIG. 2 illustrates Architecture Diagram of a Distributed Unit (DU) 200 according to at least one embodiment.

In FIG. 2, DU 200 is divided horizontally into DU High 210 and DU Low 250. DU High 210 handles the layer 2 (L2) functional blocks, which are the RLC, e.g., RLC UL 212, RLC DL 214, and MAC layer 216, including MAC Scheduler (SCH) 218 and Lower MAC 220. DU Low 250 covers the layer 1 (L1) functional block. DU High 210 further includes DU App 222 and other DU Utilities and Functions 224. The DU App 222 includes Configuration Handler 226, DU Manager 228, UE Manager 230, Stream Control Transmission Protocol (SCTP) Manager 232, evolved-GPRS Tunnelling Protocol (eGTP) Manager 234, and ASN.1 Codecs 236.

DU App 222 configures and manages the operations of the DU 200. DU App 222 interfaces with external entities. For example, DU App 222 interacts with OAM on an O1 interface for configuration, alarms and performance management. DU App 222 interacts with CU 240 for RAN functionalities over the F1 interface 242, which is built on SCTP. Control messages are exchanged on an F1-C interface and data messages on an F1-U interface. DU App 222 interacts with RAN Intelligent Controller (RIC) 244 on E2 interface 246 over SCTP. Service Management and Orchestration (SMO) 248 oversees the orchestration aspects, and the management and automation of RAN elements.

Configuration Handler 226 manages the configurations received on O1 interfaces and stores them within DU App 222. DU Manager 228 handles cell operations at the DU App 222. UE Manager 230 handles UE contexts at the DU App 222. SCTP handler 232 is responsible for establishing SCTP connections with DU Low 250 240 on the F1AP 252 and RIC 244 on the E2AP interface 246. EGTP handler 234 is responsible for establishing EGTP connection with CU 240 for data message exchange on the F1-U interface 242. ASN.1 Codecs 236 contain ASN.1 encode/decode functions which are used for System information, F1AP and E2AP messages.

RLC, e.g., RLC UL 212, RLC DL 214, provides services for transferring the control and data messages between MAC layer 216 and CU 240 via DU App 222. RLC UL 212 and RLC DL 214 are the submodules of the RLC that implement uplink and downlink functionality, respectively.

MAC 216 uses the services of the physical layer to send and receive data on the various logical channels. MAC 216 is responsible for multiplexing and de-multiplexing of the data on various logical channels. MAC Scheduler (SCH) 218 schedules resources in UL and DL for a cell and UEs based procedures. Lower MAC 220 interfaces between the MAC 216 and the DU Low 250, and implements the messages of Functional Application Platform Interface (FAPI) interface 252 so the DU High 210 and the DU Low 250 are able to communicate.

DU Low 250 includes mostly L1 Processing Blocks. Physical DL Control Channel (PDCCH) 254 is the Physical Downlink Control Channel that carries scheduling information to individual UEs, i.e., resource assignments for uplink and downlink data and control information. Physical DL Shared Channel (PDSCH) 256 is the physical downlink channel that carries the DL-SCH coded data. Physical UL Control Channel (PUCCH) 258 is the Physical Uplink Control Channel that carries uplink control information including channel quality info, acknowledgements, and scheduling requests. Physical UL Shared Channel (PUSCH) 260 is the physical channel that carries the user data. Physical Broadcast Channel (PBCH) 262 and Physical Random Access Channel (PRACH) 264 have independent blocks. The task scheduling is divided into 2 blocks: one for UL and one for DL. UL Task Scheduling 266 and DL Task Scheduling 268 manage queued tasks and begin the processing operations correspondingly. L2 FAPI Processing 270 handles the FAPI protocol L2 interface request/response. Fronthaul (FH) Interface Processing 272 handles communication between the DU 200 and a Radio Unit (RU) 290. Forward Error Correction (FEC) Acceleration Process 274 handles FEC operations such as passing FEC requests to hardware and invoking callback function on acceleration processing completion. Timing Events 276 handles timing-related operations.

Figure 3:
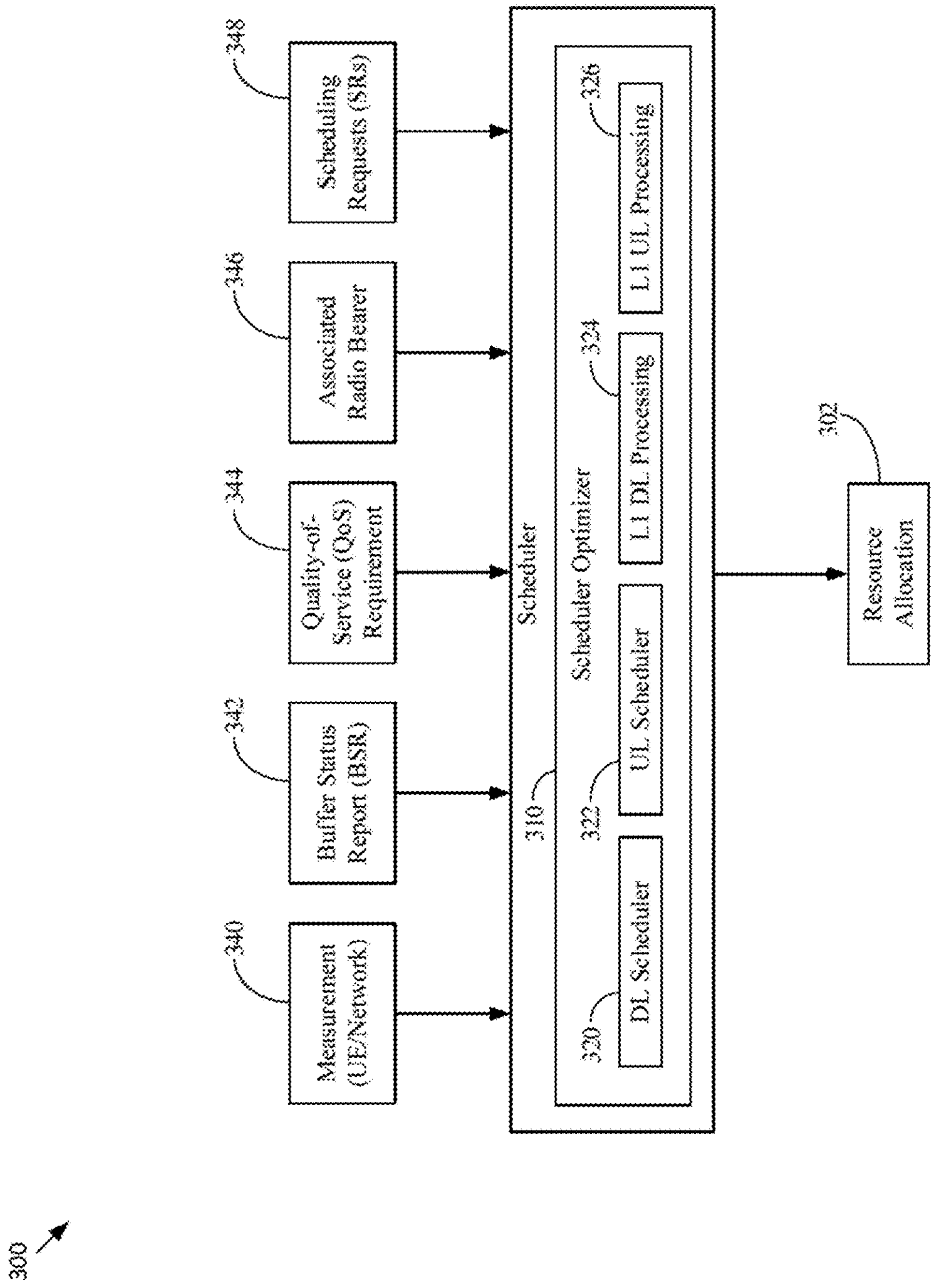
FIG. 3 is a block diagram of a Scheduler according to at least one embodiment.

FIG. 3 is a block diagram of a Scheduler 300 according to at least one embodiment.

In FIG. 3, Scheduler 300 is used to provide Resource Allocation 302 for transmitting data. In at least one embodiment, a method for providing Scheduler Optimizer 310 of Scheduler 300 maintains the downlink PRB restriction dynamic based on an uplink load scenario. Schedule Optimizer 310 in Scheduler 300 efficiently uses Distributed Unit (DU) resources in a pooling environment. Scheduling Optimizer 310 uses information about what is actually scheduled in UL to scale the average load limit in DL to increase PRBs. This improves the spectral efficiency DL. In the scenario where UL is not heavily loaded, but there are a lot of streaming requests coming in, the network is able to relax the static limit of 70%, and is actually able to go increase to 100%. Scheduling Optimizer 310 incudes a DL Scheduler 320, an UL Scheduler 322, L1 DL Processing 324, and L1 UL Processing 326.

Scheduler 300 is configured to pass subframe scheduling information from UL Scheduler 322 to a DL Scheduler 320 so that UL Scheduler 322 is able to share scheduling information with DL Scheduler 320. DL scheduling is performed by DL scheduler 320 for subframe N using X subframe look ahead at subframe N-X, and UL Scheduler 322 uses Y subframe look ahead at subframe N-Y. In at least one embodiment, X is equal to 2 for providing 2 subframe look ahead at subframe N-2 by DL scheduler 320, and Y is equal to 6 for providing 6 subframe look ahead at subframe N-6 by UL scheduler 322. The timing relationship between the UL look ahead and the DL look ahead is able to be different from the 2 subframe look ahead for DL scheduling and the 6 subframe look ahead for UL scheduling. For example, the DL scheduling is able to look at N-2 whereas the UL scheduling is able to be performed using one of 5 subframe look ahead at subframe N-5, 6 subframe look ahead at subframe N-6, or 7 subframe look ahead at subframe N-7. A priori UL information about the subframe N-Y previously determined by the UL Scheduler 322 is obtained by the DL Scheduler 320. L1 UL Processing 326 over the area N overlaps with the decoding process for N-2 by UL Scheduler 322. Looking at N, when DL Scheduler 320 is getting scheduled for N, the UL Scheduler 322 already has access to scheduling information for N-2 from L1 UL Processing 326, i.e., N-2, based on UL Scheduler 322 processing N-2 at subframe N-8. The a priori UL information includes scheduled PRB knowledge.

Scheduler 300 makes scheduling decisions based on different types of input. In FIG. 3. Scheduler 300 is shown receiving Measurements 340, e.g., from UEs and from the Network. Scheduler also receives Buffer Status Report (BSR) 342, Quality-of-Service (QOS) Requirements 344, Associated Radio Bearer 346, and Scheduling Requests (SRS) 348. Measurements 340 provide Scheduler 300 information that is used for scheduling operations, such as transport volume and information about UEs. Buffer Status Report (BSR) 342 provide Scheduler 300 with the amount of data available for transmission stored in a buffer of Scheduler 300. Quality-of-Service (QoS) Requirements 344 provide information for handling different classes of service and traffic. Associated Radio Bearer 346 identifies the type of radio bearers, e.g., Data Radio Bearers (DRBs) for user plane data and Signaling Radio Bearers (SRBs) for control plane data. Scheduling Requests (SRs) 348 are request for UL scheduling resources for new transmission.

Figure 4:
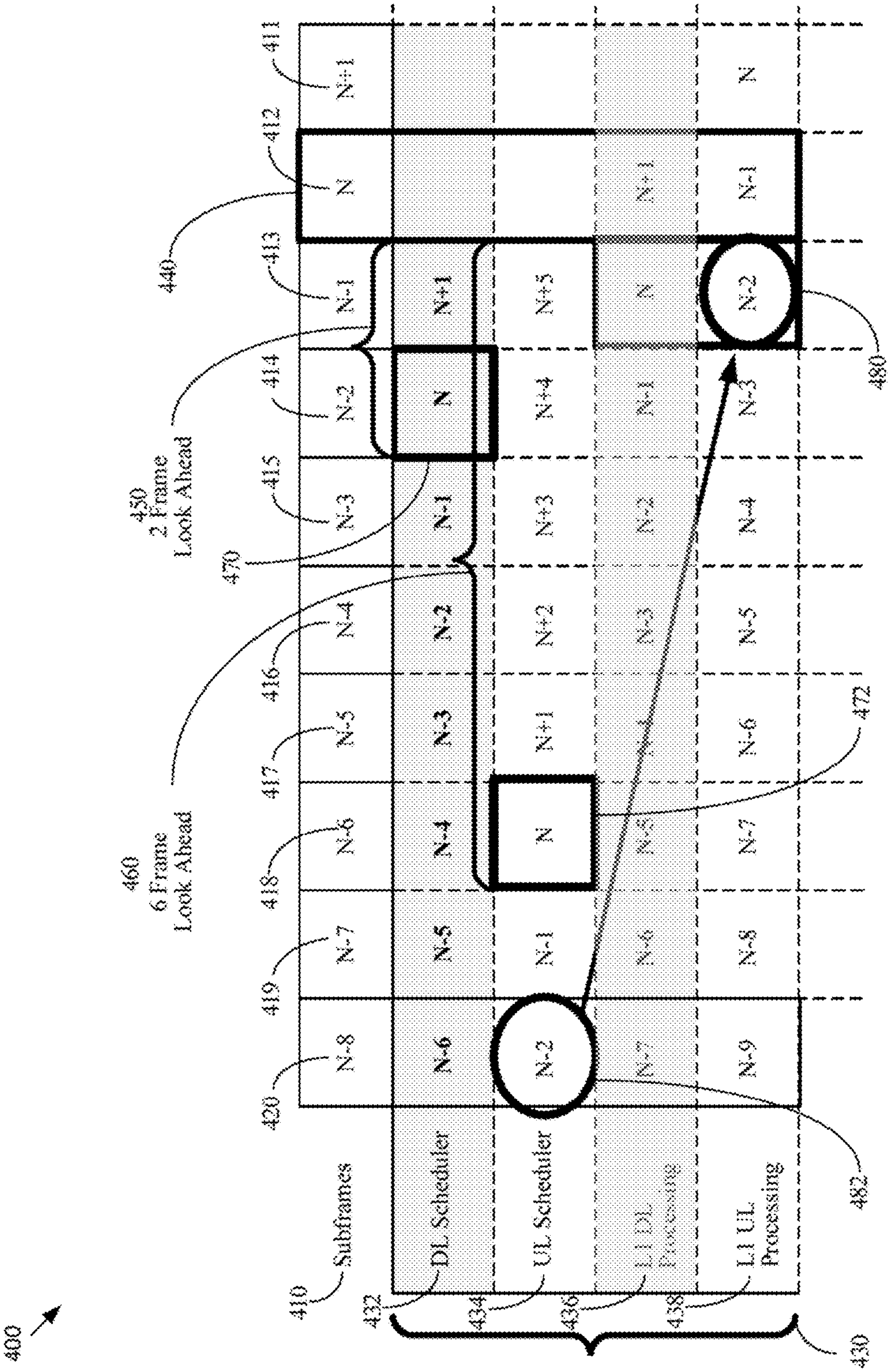
FIG. 4 is a scheduler timing diagram for a Scheduler Optimizer according to at least one embodiment.

FIG. 4 is a scheduler timing diagram 400 for a Scheduler Optimizer according to at least one embodiment.

In FIG. 4, Over-The-Air (OTA) subframe 410 are shown for scheduling Downlink (DL) subframes and Downlink (DL) subframes. The OTA subframes 410 are shown including subframe N+1 411, N 412, N-1 413, N-2 414, N-3 415, N-4 416, N-5 417, N-6 418, N-7 419, N-8 420. In at least one embodiment, a Scheduler 430 includes a Downlink (DL) Scheduler 432 and an Uplink (UL) Scheduler 434. However, the DL Scheduler 430 and the UL Scheduler 432 are able to be implemented separately. Scheduler 430 also include L1 DL Processing 436 and L1 UL Processing 438. The DL Scheduler 432 performs X subframe look ahead scheduling while UL Scheduler performs Y subframe look ahead scheduling. For example, our interest of subframe is N 440. In at least one embodiment, for subframe N, X is equal to 2 for providing DL Scheduler 342 a 2 subframe look ahead 450 at subframe N-2 414. In at least one embodiment, for subframe N, Y is equal to 6 for providing UL Scheduler 434 a 6 subframe look ahead 460 at subframe N-6 418. However, UL scheduling is able to be performed by UL scheduler for subframe N 440 using one of 5 subframe look ahead at subframe N-5, 6 subframe look ahead at subframe N-6, or 7 subframe look ahead at subframe N-7. Information is able to be passed from UL Scheduler 434 to DL scheduler 432 so that the DL scheduler 432 is able to dynamically scale up the number of resources that the DL scheduler 432 is able to use.

DL scheduling for N 470 happens in Subframe N-2 414. UL scheduling for N 472 is at Subframe N-6 418. in response to the DL scheduler 432 hitting N-2 414, Scheduler 430 is scheduling for N 470 at N-2 414, whereas the UL Scheduler 434 has already processed N 472 at N-6 418. UE starts scheduling at N but the current subframe has to be sent from the gNb and the grant goes out in N-4 416, so the scheduling happens in N-6 418.

In LTE, the timing looks a little different. In LTE timing there is a static gap between the UE being granted a transmission time, and when actual transmission occurs. UE expect grant at N-4 416, for transmission of N 472. The Scheduling Optimization method according to at least one embodiment uses N-2 414 based on a 2 subframe look ahead 450 at the DL Scheduler 432. DL scheduling for N 472 happens at N-2 414 and UL scheduling for N 472 happens at N-6 418.

L1 UL Processing 438 over the area N 440 overlaps with decoding processing at N-2 414 by UL Scheduler 432. In response to DL scheduler 432 getting scheduled for N 470, the UL Scheduler 434 already has access to scheduling information for N-2 480 from L1 UL Processing 438, based on UL Scheduler 434 processing N-2 482 at N-8 420. Thus, a priori UL information about the subframe N-2 482 previously determined by the UL Scheduler 434 is obtained by the DL Scheduler 432. The a priori UL information about the subframe N-8 420 previously determined by the UL Scheduler 434 includes scheduled PRB knowledge previously determined by the UL Scheduler 434. The a priori UL information of N-2 482 at subframe N-8 420 previously determined by the UL Scheduler 434 is able to be obtained by DL Scheduler 432 to increase a DL PRB limit in response to the UL Scheduler 434 being under scheduled.

Current scheduling methods of static PRB are sub-optimal because the UL scheduled PRB are less than the system limit. The system limit depends on the operator. The system limit is dependent from a cost perspective and the traffic pattern the operator sees. In the Scheduling Optimization method according to at least one embodiment, the limit is a configurable parameter. The limit is able to be set at 100% in DL and UL. However, in response to being set at 100, the Scheduling Optimization method according to at least one embodiment confers no benefit. However, the basis of pooling more carriers into the same baseband processing unit is to leverage the fact that not all the cells are going to be transmitting at same time and the limit is set, for example, at 70% or 80%.

Budget resources are not used for peak load of all cells, but resources are able to be allocated for average cell utilization where the average load is able to be set at 70%, 80%, etc. The limit depends on how operator sees the network. The timing relationship between the UL look ahead and the DL look ahead is able to be different from the 2 subframe look ahead 450 for DL Scheduler 432 and the 6 subframe look ahead 460 for UL Scheduler 434. For example, the DL scheduling is able to look at N-2 whereas the UL scheduling is able to look at N-5. However, there is a hard limit of 3 for such differences, e.g., N-5, N-6, N-7. So while scheduling DL for N 470, the DL Scheduler 432 is able to obtain information about N-2 482 scheduled by UL Scheduler 434 schedule of PRB load as scheduling would have happened in N-8 subframe 420.

The Scheduling Optimization method as illustrated in FIG. 4 provides a cell level throughput increase, PRB utilization improvement, improvement of overall KPIs in the network for busy load scenarios, etc. Scheduler Optimization according to at least one embodiment applies to 4G, 5G, TDD/FDD and massive-MIMO (Multiple-Input Multiple-Output) implementations.

Figure 5:
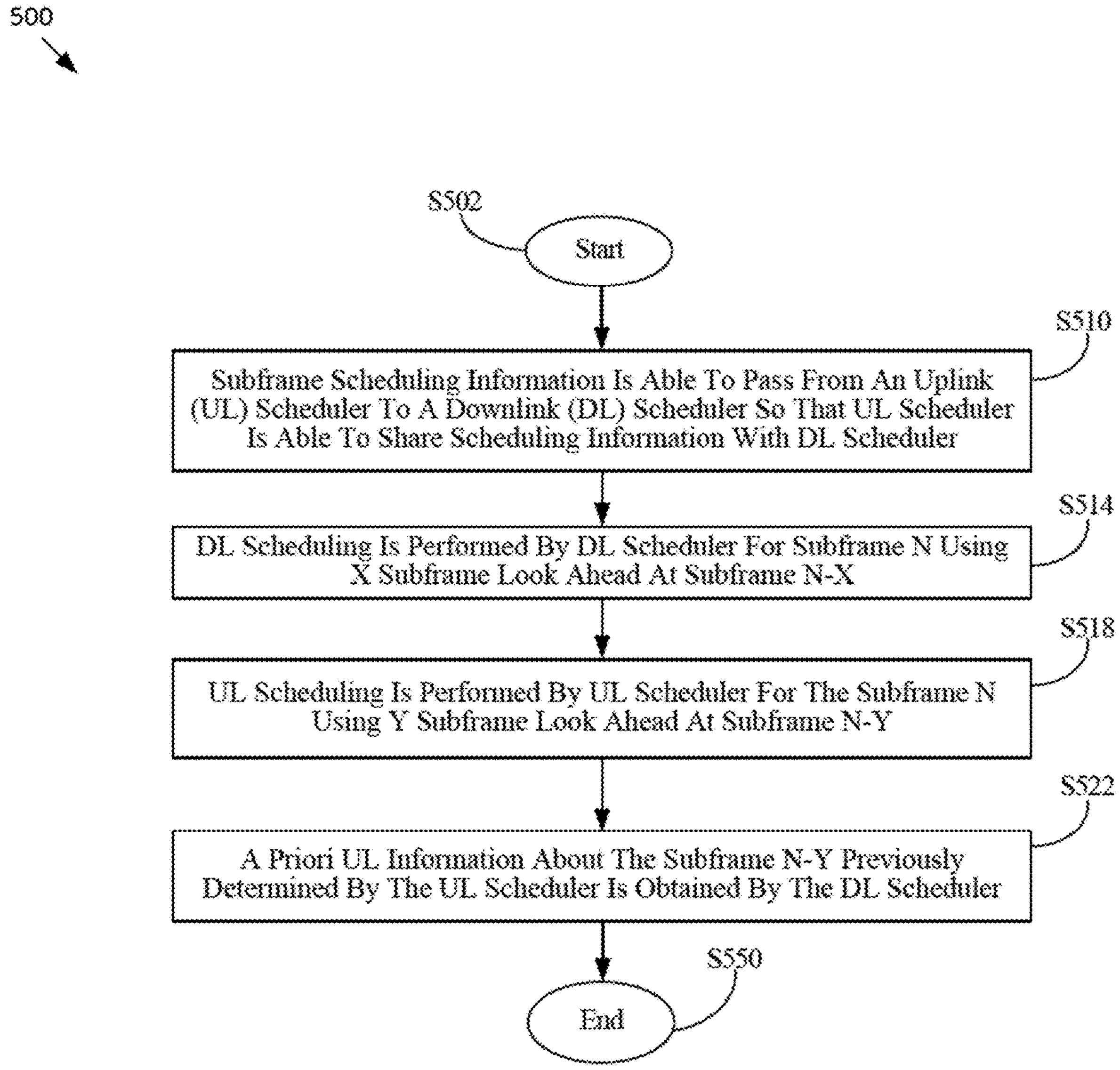
FIG. 5 is a flow chart of a method for providing Scheduler Optimization of Distributed Unit (DU) resources in a pooling environment of carriers according to at least one embodiment.

FIG. 5 is a flow chart 500 of a method for providing Scheduler Optimization of Distributed Unit (DU) resources in a pooling environment of carriers according to at least one embodiment.

Subframe scheduling information is able to pass from an uplink (UL) scheduler to a downlink (DL) scheduler so that UL Scheduler is able to share scheduling information with DL Scheduler S510. Referring to FIG. 4, information is able to be passed between UL scheduler and DL scheduler so that the DL scheduler is able to dynamically scale up the number of resources that the DL scheduler is able to use.

DL scheduling is performed by DL scheduler for subframe N using X subframe look ahead at subframe N-X S514. Referring to FIG. 4, The DL Scheduler performs X subframe look ahead scheduling while UL Scheduler performs Y subframe look ahead scheduling. For example, our interest of subframe is N. In at least one embodiment, for subframe N, X is equal to 2 for providing 2 subframe look ahead at subframe N-2 by DL scheduler.

UL scheduling is performed by UL scheduler for the subframe N using Y subframe look ahead at subframe N-Y S518. Referring to FIG. 4, in at least one embodiment, for subframe N, Y is equal to 6 for providing 6 subframe look ahead at subframe N-6 by UL scheduler. The timing relationship between the UL look ahead and the DL look ahead is able to be different from the 2 subframe look ahead for DL scheduling and the 6 subframe look ahead for UL scheduling. For example, the DL scheduling is able to look at N-2 whereas the UL scheduling is able to look at N−5. However, there is a hard limit of 3 for such differences, e.g., N-5, N-6, N-7.

A priori UL information about the subframe N-Y previously determined by the UL scheduler is obtained by the DL Scheduler S522. Referring to FIG. 4, L1 processing for over the area N overlaps with N-2 UL decoding processing. Looking at UL N, when DL scheduler is getting scheduled for N, the UL scheduler already has access to scheduling information for N-2 from L2 UL processing, i.e., N-2, based on UL scheduler processing N-2 at N-8. The a priori UL information about the subframe N-6 previously determined by the UL scheduler includes scheduled PRB knowledge previously determined by the UL scheduler. The a priori UL information about the subframe N-6 previously determined by the UL scheduler is able to be obtained to increase a DL PRB limit in response to the UL scheduler being under scheduled.

The process then terminates S550.

At least one embodiment of the method for optimizing use of Distributed Unit (DU) resources in an environment of pooling of carriers includes enabling passing of subframe scheduling information from an uplink (UL) scheduler to a downlink (DL) scheduler, performing DL scheduling by the DL scheduler for subframe N using X subframe look ahead at subframe N-X, performing UL scheduling by the UL scheduler for the subframe N using Y subframe look ahead at subframe N-Y, and obtaining a priori UL information about the subframe N-Y previously determined by the UL scheduler.

Figure 6:
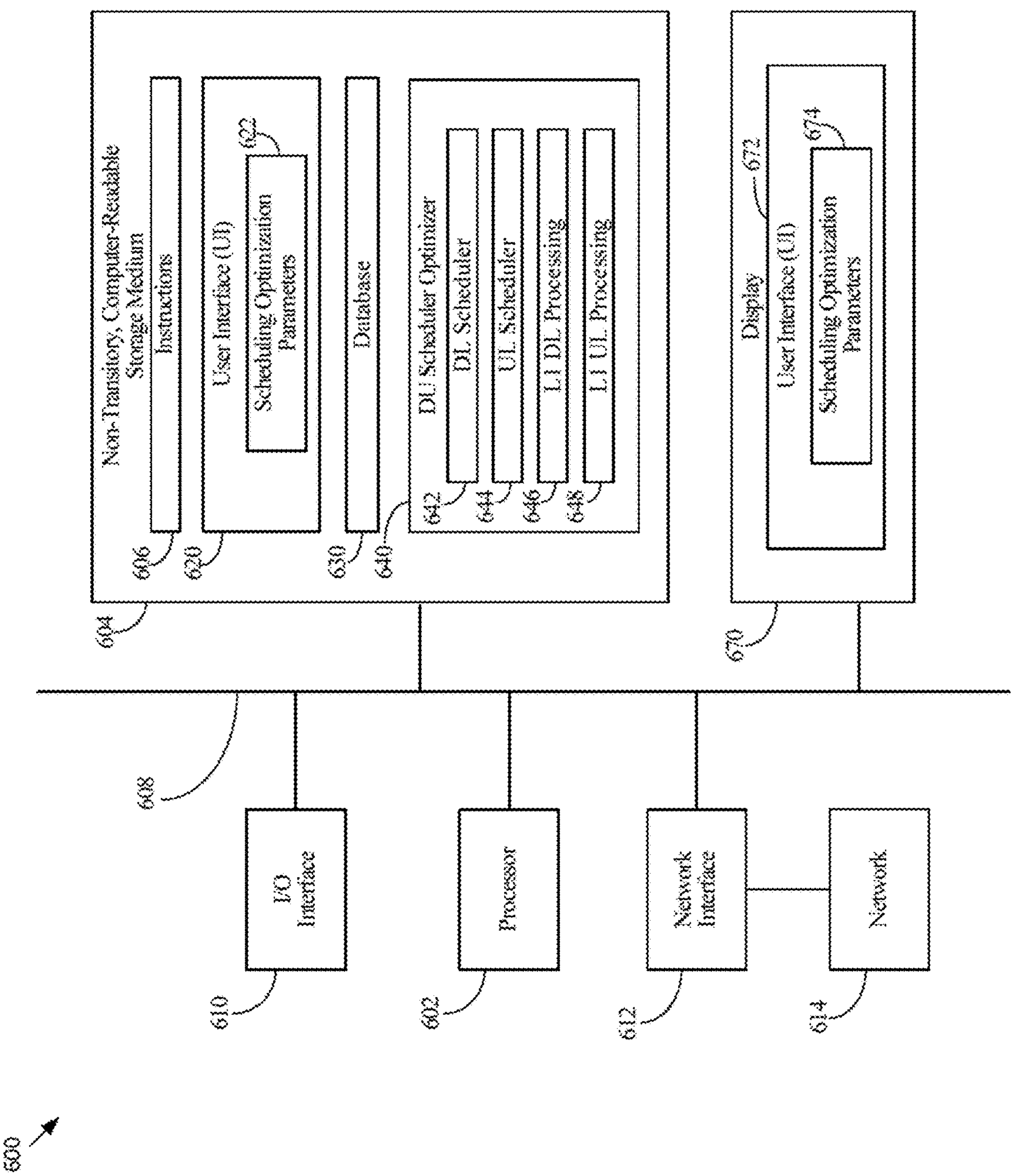
FIG. 6 is a high-level functional block diagram of a processor-based system according to at least one embodiment.

FIG. 6 is a high-level functional block diagram of a processor-based system 600 according to at least one embodiment.

In at least one embodiment, processing circuitry 600 provides Scheduler Optimization for efficiently using Distributed Unit (DU) resources in a pooling environment. Processing circuitry 600 implements a Scheduler 640 for providing Scheduling Optimization. Processor 602 implements Scheduler 640 with a Downlink (DL) Scheduler 642, Uplink (UL) Scheduler 644, Layer 1 (L1) L1 DL Processing 646, and L1 UL Processing 648. DL Scheduler 642 performs 2 subframe look ahead scheduling while an UL Scheduler 644 performs 6 subframe look ahead scheduling. Information is able to be passed between UL scheduler 644 and DL scheduler 642 so that the DL scheduler 642 is able to dynamically scale up the number of resources that the DL scheduler 642 is able to use. The Scheduler 640 for providing Scheduling Optimization obtains Subframe Information from L1 UL Processing 648 for use in DL Scheduler 64. Subframes for DL Scheduler 642 are set in subframes according to the look ahead for the DL Scheduler 642.

Processing circuitry 600 also includes a Non-Transitory, Computer-Readable Storage Medium 604 that is used to implement a Scheduling Optimization method according to at least one embodiment. Non-Transitory, Computer-Readable Storage Medium 604, amongst other things, is encoded with, i.e., stores, Instructions 606, i.e., computer program code, that are executed by Processor 602 causes Processor 602 to perform operations for providing a Scheduling Optimization method. Execution of Instructions 606 by Processor 602 represents (at least in part) an application which implements at least a portion of the methods described herein in accordance with one or more embodiments (hereinafter, the noted processes and/or methods).

Processor 602 is electrically coupled to Non-Transitory, Computer-Readable Storage Medium 604 via a Bus 608. Processor 602 is electrically coupled to an Input/Output (I/O) Interface 610 by Bus 608. A Network Interface 612 is also electrically connected to Processor 602 via Bus 608. Network Interface 612 is connected to a Network 614, so that Processor 602 and Non-Transitory, Computer-Readable Storage Medium 604 connect to external elements via Network 614. Processor 602 is configured to execute Instructions 606 encoded in Non-Transitory, Computer-Readable Storage Medium 604 to cause processing circuitry 600 to be usable for performing at least a portion of the processes and/or methods. In one or more embodiments, Processor 602 is a Central Processing Unit (CPU), a multi-processor, a distributed processing system, an Application Specific Integrated Circuit (ASIC), and/or a suitable processing unit.

Processing circuitry 600 includes I/O Interface 610. I/O interface 610 is coupled to external circuitry. In one or more embodiments, I/O Interface 610 includes a keyboard, keypad, mouse, trackball, trackpad, touchscreen, and/or cursor direction keys for communicating information and commands to Processor 602.

Processing circuitry 600 also includes Network Interface 612 coupled to Processor 602. Network Interface 612 allows processing circuitry 600 to communicate with Network 614, to which one or more other computer systems are connected. Network Interface 612 includes wireless network interfaces such as Bluetooth, Wi-Fi, Worldwide Interoperability for Microwave Access (WiMAX), General Packet Radio Service (GPRS), or Wideband Code Division Multiple Access (WCDMA); or wired network interfaces such as Ethernet, Universal Serial Bus (USB), or Institute of Electrical and Electronics Engineers (IEEE) 864.

Processing circuitry 600 is configured to receive information through I/O Interface 610. The information received through I/O Interface 610 includes one or more of instructions, data, design rules, libraries of cells, and/or other parameters for processing by Processor 602. The information is transferred to Processor 602 via Bus 608. Processing circuitry 600 is configured to receive information related to a User Interface (UI) through I/O Interface 610. The information is stored in Non-Transitory, Computer-Readable Storage Medium 604 as UI 622.

In one or more embodiments, one or more Non-Transitory, Computer-Readable Storage Medium 604 having stored thereon Instructions 606 (in compressed or uncompressed form) that may be used to program a computer, processor, or other electronic device) to perform processes or methods described herein. The one or more Non-Transitory, Computer-Readable Storage Medium 604 include one or more of an electronic storage medium, a magnetic storage medium, an optical storage medium, a quantum storage medium, or the like.

For example, the Non-Transitory, Computer-Readable Storage Medium 604 may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. In one or more embodiments using optical disks, the one or more Non-Transitory Computer-Readable Storage Media 604 includes a Compact Disk-Read Only Memory (CD-ROM), a Compact Disk-Read/Write (CD-R/W), and/or a Digital Video Disc (DVD).

In one or more embodiments, Non-Transitory, Computer-Readable Storage Medium 604 stores Instructions 606 configured to cause Processor 602 to perform at least a portion of the processes and/or methods for optimizing resources of a Distributed Unit (DU) Scheduler in a pooling environment. In one or more embodiments, Non-Transitory, Computer-Readable Storage Medium 604 also stores information, such as algorithm which facilitates performing at least a portion of the processes and/or methods for providing Scheduler Optimization according to embodiments described herein. Accordingly, in at least one embodiment, Processor 602 executes Instructions 606 stored on the one or more Non-Transitory, Computer-Readable Storage Medium 604 to provide a Scheduler Optimizer that efficiently uses Distributed Unit (DU) resources in a pooling environment. Processor 602 implements a Scheduling Optimizer 640 that uses information about what has been processed in UL to scale the average load limit in DL to increase PRBs and thus improve spectral efficiency of the DL Scheduler. Operators are usually more concerned about the DL because that is where benchmarks for download and upload speeds are measured. In the scenario where UL is not heavily loaded, but there are a lot of streaming requests coming in, the network is able to relax the static limit of 70%, and is actually able to go increase to 100%. Processor 602 executes Instructions 606 to provide a User Interface 620 for presenting or editing Scheduling Optimization parameters 622, such as Average DL and UL Load Percentage, Peak Load, DL Look Ahead, and UL Look Ahead. Data is stored in Database 630. Processor 602 executes Instructions to implement DU Scheduler Optimizer 640, which includes a DL Scheduler 642, an UL Scheduler 644, L1 DL Processing 646, and L1 UL Processing 648. Processor 602 executes Instructions 606 to present a User Interface (UI) 672 on a Display 670. User Interface (UI) 672 presents on Display 670 the Scheduling Optimization Parameters 674, such as Average DL and UL Load Percentage, Peak Load, DL Look Ahead, and UL Look Ahead. Processor 602 executes instructions 602 to implement DU Scheduler Optimizer 640, which is enabled to pass subframe scheduling information from an uplink (UL) scheduler to a downlink (DL) scheduler so that UL Scheduler is able to share scheduling information with DL Scheduler. Processor 602 executes instructions 606 to cause DL Scheduler 642 to perform DL scheduling for subframe N using X subframe look ahead at subframe N-X, and to cause UL Scheduler 644 to perform UL scheduling for subframe N using Y subframe look ahead at subframe N-Y. n at least one embodiment, for subframe N, X is equal to 2 for providing 2 subframe look ahead at subframe N−2 by DL scheduler, and Y is equal to 6 for providing 6 subframe look ahead at subframe N-6 by UL scheduler. Processor 602 is able to control the timing relationship between the UL look ahead and the DL look ahead using Scheduling Optimization Parameters 622. For example, Processor 602 is able to set the DL scheduling to look at N-2 and the UL scheduling to look at N-5, N-6, N-7. However, there is a hard limit of 3 for such differences, e.g., N-5, N-6, N-7. Processor 602 executes Instruction 606 to cause DL Scheduler 642 to obtain a priori UL information about the subframe N-6 previously determined by the UL scheduler. L1 UL Processing 648 over the area N overlaps with processing at N-2 for UL Scheduler 644. Looking at N, when DL Scheduler 642 is getting scheduled for N, the UL Scheduler 644 already has access to scheduling information for N-1 from L2 UL Processing 648, i.e., N-2, based on UL Scheduler 644 processing N-2 at N-8. The a priori UL information about the subframe N-6 previously determined by the UL Scheduler 644 includes scheduled PRB knowledge previously determined by the UL Scheduler 644. The a priori UL information about the subframe N-6 previously determined by the UL Scheduler 644 is able to be obtained to increase a DL PRB limit in response to the UL scheduler 644 being under scheduled.

Embodiments described herein provide a method that provides one or more advantages. For example, by using a priori UL scheduled PRB knowledge, the downlink PRB limit is increased in case the UL scheduler is under scheduled. Using the a priori information also results in increased cell level throughput, PRB utilization improvement, and improvement of overall KPIs in the network for busy load scenarios.

An aspect of this description is directed to a method [1] for optimizing use of Distributed Unit (DU) resources in an environment of pooling of carriers includes enabling passing of subframe scheduling information from an uplink (UL) scheduler to a downlink (DL) scheduler, performing DL scheduling by the DL scheduler for subframe N using X subframe look ahead at subframe N-X, performing UL scheduling by the UL scheduler for the subframe N using Y subframe look ahead at subframe N-Y, and obtaining a priori UL information about the subframe N-Y previously determined by the UL scheduler.

The method described in [1], wherein the performing the DL scheduling by the DL scheduler for the subframe N using the X subframe look ahead at the subframe N-X includes the performing the DL scheduling by the DL scheduler for the subframe N using 2 subframe look ahead at subframe N-2, and wherein the performing the UL scheduling by the UL scheduler for the subframe N using the Y subframe look ahead at the subframe N-Y includes performing the UL scheduling by the UL scheduler for the subframe N using 6 subframe look ahead at subframe N−6.

The method described in any of [1] to [2], wherein the performing the DL scheduling by the DL scheduler for the subframe N using the X subframe look ahead at the subframe N-X includes the performing the DL scheduling by the DL scheduler for the subframe N using 2 subframe look ahead at subframe N-2, and wherein the performing the UL scheduling by the UL scheduler for the subframe N using the Y subframe look ahead at the subframe N-Y includes performing the UL scheduling by the UL scheduler for the subframe N using one of 5 subframe look ahead at subframe N-5, 6 subframe look ahead at subframe N-6, or 7 subframe look ahead at subframe N-7.

The method described in any of [1] to [3] further includes performing L1 UL processing over the subframe N, the L1 UL processing overlapping with the UL processing for the subframe N-X.

The method described in any of [1] to [4], wherein in response to X being equal to 2 for a 2 subframe look ahead used by the DL scheduler at subframe N-2 and in response to Y being equal to 6 for a 6 subframe look ahead used by the UL scheduler at subframe N-6, and wherein the obtaining the a priori UL information about the subframe N-Y previously determined by the UL scheduler includes, for the subframe N, accessing, by the DL scheduler, information of a UL scheduled PRB load for the subframe N-2 from the UL scheduler determined at subframe N-8.

The method described in any of [1] to [5], wherein the obtaining the a priori UL information about the subframe N-Y previously determined by the UL scheduler includes the obtaining the a priori UL information about the subframe N-Y previously determined by the UL scheduler to increase a DL PRB limit in response to the UL scheduler being under scheduled.

The method described in any of [1] to [6], wherein the obtaining the a priori UL information about the subframe N-Y previously determined by the UL scheduler includes obtaining scheduled PRB knowledge previously determined by the DL scheduler.

An aspect of this description is directed to a scheduler for optimizing use of Distributed Unit (DU) resources in an environment of pooling of carriers, wherein the scheduler is configured to enable passing of subframe scheduling information from uplink (UL) scheduling to a downlink (DL) scheduling, perform the DL scheduling for subframe N using X subframe look ahead at subframe N-X. perform the UL scheduling for the subframe N using Y subframe look ahead at subframe N-Y, and obtain a priori UL information about the subframe N-Y previously determined by the UL scheduling.

The scheduler described in [8], wherein X is equal to 2 for a 2 subframe look ahead at subframe N-2 for performing the DL scheduling, and Y is equal to 6 for a 6 subframe look ahead at subframe N-6 for performing the UL scheduling.

The data platform described in any of [8] to [9], wherein X is equal to 2 for a 2 subframe look ahead for performing the DL scheduling, and Y is equal to one of 5, 6, or 7 for 5 subframe look ahead, 6 subframe look ahead, or 7 subframe look ahead, respectively, for UL scheduling.

The data platform described in any of [8] to [10], wherein the processor is further configured to perform L1 UL processing over the subframe N, the L1 UL processing overlapping with the UL processing for the subframe N-X.

The data platform described in any of [8] to [11], wherein X is equal to 2 for a 2 subframe look ahead used by the DL scheduling at subframe N-2 and Y is equal to 6 for a 6 subframe look ahead used by the UL scheduling at subframe N-6, and wherein the processor is further configured to obtain the a priori UL information about the subframe N-Y previously determined by the UL scheduling by accessing, for the subframe N, DL scheduling information of a UL scheduled PRB load for the subframe N-2 from the UL scheduling determined at subframe N-8.

The data platform described in any of [8] to [12], wherein the processor is further configured to obtain the a priori UL information about the subframe N-Y previously determined by the UL scheduling by obtaining the a priori UL information about the subframe N-Y previously determined by the UL scheduling to increase a DL PRB limit in response to the UL scheduling being under scheduled.

The data platform described in any of [8] to [13], wherein the processor is further configured to obtain the a priori UL information about the subframe N-Y previously determined by the UL scheduling by obtaining scheduled PRB knowledge previously determined by the DL scheduling.

An aspect of this description is directed to a non-transitory computer-readable media having computer-readable instructions stored thereon [15], which when executed by a processor causes the processor to perform operations including enabling passing of subframe scheduling information from an uplink (UL) scheduler to a downlink (DL) scheduler, performing DL scheduling by the DL scheduler for subframe N using X subframe look ahead at subframe N-X, performing UL scheduling by the UL scheduler for the subframe N using Y subframe look ahead at subframe N-Y, and obtaining a priori UL information about the subframe N-Y previously determined by the UL scheduler.

The non-transitory computer-readable media described in [15], wherein the performing the DL scheduling by the DL scheduler for the subframe N using the X subframe look ahead at the subframe N-X includes the performing the DL scheduling by the DL scheduler for the subframe N using 2 subframe look ahead at subframe N-2, and wherein the performing the UL scheduling by the UL scheduler for the subframe N using the Y subframe look ahead at the subframe N-Y includes performing the UL scheduling by the UL scheduler for the subframe N using one of 5 subframe look ahead at subframe N-5, 6 subframe look ahead at subframe N-6, or 7 subframe look ahead at subframe N-7.

The non-transitory computer-readable media described in any of to [16], further includes performing L1 UL processing over the subframe N, the L1 UL processing overlapping with the UL processing for the subframe N-X.

The non-transitory computer-readable media described in any of to [17], wherein in response to X being equal to 2 for a 2 subframe look ahead used by the DL scheduler at subframe N-2 and in response to Y being equal to 6 for a 6 subframe look ahead used by the UL scheduler at subframe N-6, and wherein the obtaining the a priori UL information about the subframe N-Y previously determined by the UL scheduler includes, for the subframe N, accessing, by the DL scheduler, information of a UL scheduled PRB load for the subframe N-2 from the UL scheduler determined at subframe N-8.

The non-transitory computer-readable media described in any of to [18], wherein the obtaining the a priori UL information about the subframe N-Y previously determined by the UL scheduler includes the obtaining the a priori UL information about the subframe N-Y previously determined by the UL scheduler to increase a DL PRB limit in response to the UL scheduler being under scheduled.

The non-transitory computer-readable media described in any of to [19], wherein the obtaining the a priori UL information about the subframe N-Y previously determined by the UL scheduler includes obtaining scheduled PRB knowledge previously determined by the DL scheduler.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the embodiments have been described in language specific to structural features or methodological acts, the subject matter defined in the appended claims is not necessarily limited to the specific features or acts described. Rather, the specific features and acts are disclosed as exemplary forms of implementing the claims.

What is claimed is:

1. A method for optimizing use of Distributed Unit (DU) resources in an environment of pooling of carriers, comprising:
- enabling passing of subframe scheduling information from an uplink (UL) scheduler to a downlink (DL) scheduler;
- performing DL scheduling by the DL scheduler for subframe N using X subframe look ahead at subframe N-X;
- performing UL scheduling by the UL scheduler for the subframe N using Y subframe look ahead at subframe N-Y; and
- obtaining a priori UL information about the subframe N-Y previously determined by the UL scheduler, wherein the obtaining the a priori UL information about the subframe N-Y previously determined by the UL scheduler includes the obtaining the a priori UL information about the subframe N-Y previously determined by the UL scheduler to increase a DL PRB limit in response to the UL scheduler being under scheduled, and wherein N is an integer representing an order of subframes, X is an integer representing a number of subframes the DL scheduler looks ahead for the DL scheduling, and Y is an integer representing a number of subframes the UL scheduler looks ahead for the UL scheduling.

2. The method of claim 1, wherein the performing the DL scheduling by the DL scheduler for the subframe N using the X subframe look ahead at the subframe N-X includes the performing the DL scheduling by the DL scheduler for the subframe N using 2 subframe look ahead at subframe N-2, and wherein the performing the UL scheduling by the UL scheduler for the subframe N using the Y subframe look ahead at the subframe N-Y includes performing the UL scheduling by the UL scheduler for the subframe N using 6 subframe look ahead at subframe N-6.

3. The method of claim 1, wherein the performing the DL scheduling by the DL scheduler for the subframe N using the X subframe look ahead at the subframe N-X includes the performing the DL scheduling by the DL scheduler for the subframe N using 2 subframe look ahead at subframe N-2, and wherein the performing the UL scheduling by the UL scheduler for the subframe N using the Y subframe look ahead at the subframe N-Y includes performing the UL scheduling by the UL scheduler for the subframe N using one of 5 subframe look ahead at subframe N-5, 6 subframe look ahead at subframe N-6, or 7 subframe look ahead at subframe N-7.

4. The method of claim 1, further comprising performing L1 UL processing over the subframe N, the L1 UL processing overlapping with processing by the UL scheduler for the subframe N-X.

5. The method of claim 1, wherein in response to X being equal to 2 for a 2 subframe look ahead used by the DL scheduler at subframe N-2 and in response to Y being equal to 6 for a 6 subframe look ahead used by the UL scheduler at subframe N-6, and wherein the obtaining the a priori UL information about the subframe N-Y previously determined by the UL scheduler includes, for the subframe N, accessing, by the DL scheduler, information of a UL scheduled PRB load for the subframe N-2 from the UL scheduler determined at subframe N-8.

6. The method of claim 1, wherein the obtaining the a priori UL information about the subframe N-Y previously determined by the UL scheduler includes obtaining scheduled PRB knowledge previously determined by the DL scheduler.

7. A scheduler for optimizing use of Distributed Unit (DU) resources in an environment of pooling of carriers, wherein the scheduler includes a processor that is configured to:
- enable passing of subframe scheduling information from uplink (UL) scheduling to a downlink (DL) scheduling;
- perform the DL scheduling for subframe N using X subframe look ahead at subframe N-X:
- perform the UL scheduling for the subframe N using Y subframe look ahead at subframe N-Y; and
- obtain a priori UL information about the subframe N-Y previously determined by the UL scheduling by obtaining the a priori UL information about the subframe N-Y previously determined by the UL scheduling to increase a DL PRB limit in response to the UL scheduling being under scheduled, wherein N is an integer representing an order of subframes, X is an integer representing a number of subframes the DL scheduler looks ahead for the DL scheduling, and Y is an integer representing a number of subframes the UL scheduler looks ahead for the UL scheduling.

8. The scheduler of claim 7, wherein X is equal to 2 for a 2 subframe look ahead at subframe N-2 for performing the DL scheduling, and Y is equal to 6 for a 6 subframe look ahead at subframe N-6 for performing the UL scheduling.

9. The scheduler of claim 7, wherein X is equal to 2 for a 2 subframe look ahead for performing the DL scheduling, and Y is equal to one of 5, 6, or 7 for 5 subframe look ahead, 6 subframe look ahead, or 7 subframe look ahead, respectively, for the UL scheduling.

10. The scheduler of claim 7, wherein the processor is further configured to perform L1 UL processing over the subframe N, the L1 UL processing overlapping with processing by the UL scheduler for the subframe N-X.

11. The scheduler of claim 7, wherein X is equal to 2 for a 2 subframe look ahead used by the DL scheduling at subframe N-2 and Y is equal to 6 for a 6 subframe look ahead used by the UL scheduling at subframe N-6, and wherein the processor is further configured to obtain the a priori UL information about the subframe N-Y previously determined by the UL scheduling by accessing, for the subframe N, DL scheduling information of a UL scheduled PRB load for the subframe N-2 from the UL scheduling determined at subframe N-8.

12. The scheduler of claim 7, wherein the processor is further configured to obtain the a priori UL information about the subframe N-Y previously determined by the UL scheduling by obtaining scheduled PRB knowledge previously determined by the DL scheduling.

13. A non-transitory computer-readable media having computer-readable instructions stored thereon, which when executed by a processor causes the processor to perform operations comprising:

enabling passing of subframe scheduling information from an uplink (UL) scheduler to a downlink (DL) scheduler;

performing DL scheduling by the DL scheduler for subframe N using X subframe look ahead at subframe N-X;

performing UL scheduling by the UL scheduler for the subframe N using Y subframe look ahead at subframe N-Y; and obtaining a priori UL information about the subframe N-Y previously determined by the UL scheduler, wherein the obtaining the a priori UL information about the subframe N-Y previously determined by the UL scheduler includes the obtaining the a priori UL information about the subframe N-Y previously determined by the UL scheduler to increase a DL PRB limit in response to the UL scheduler being under scheduled, and wherein N is an integer representing an order of subframes, X is an integer representing a number of subframes the DL scheduler looks ahead for the DL scheduling, and Y is an integer representing a number of subframes the UL scheduler looks ahead for the UL scheduling.

14. The non-transitory computer-readable media of claim 13, wherein the performing the DL scheduling by the DL scheduler for the subframe N using the X subframe look ahead at the subframe N-X includes the performing the DL scheduling by the DL scheduler for the subframe N using 2 subframe look ahead at subframe N-2, and wherein the performing the UL scheduling by the UL scheduler for the subframe N using the Y subframe look ahead at the subframe N-Y includes performing the UL scheduling by the UL scheduler for the subframe N using one of 5 subframe look ahead at subframe N-5, 6 subframe look ahead at subframe N-6, or 7 subframe look ahead at subframe N-7.

15. The non-transitory computer-readable media of claim 13, further comprising performing L1 UL processing over the subframe N, the L1 UL processing overlapping with processing by the UL scheduler for the subframe N-X.

16. The non-transitory computer-readable media of claim 13, wherein in response to X being equal to 2 for a 2 subframe look ahead used by the DL scheduler at subframe N-2 and in response to Y being equal to 6 for a 6 subframe look ahead used by the UL scheduler at subframe N-6, and wherein the obtaining the a priori UL information about the subframe N-Y previously determined by the UL scheduler includes, for the subframe N, accessing, by the DL scheduler, information of a UL scheduled PRB load for the subframe N-2 from the UL scheduler determined at subframe N-8.

17. The non-transitory computer-readable media of claim 13, wherein the obtaining the a priori UL information about the subframe N-Y previously determined by the UL scheduler includes obtaining scheduled PRB knowledge previously determined by the DL scheduler.

* * * * *